(12) United States Patent
Kuo (10) Patent No.: US 10,767,898 B2
(45) Date of Patent: Sep. 8, 2020

(54) PORTABLE HOT WATER SUPPLY TANK

(71) Applicant: Hong Yuan International Co., Ltd., Taichung (TW)

(72) Inventor: Chun-Yuan Kuo, Taichung (TW)

(73) Assignee: HONG YUAN INTERNATIONAL CO., LTD., Taichung (TW)

( * ) Notice: Subject to any disclaimer, the term of this patent is extended or adjusted under 35 U.S.C. 154(b) by 176 days.

(21) Appl. No.: 16/168,918

(22) Filed: Oct. 24, 2018

(65) Prior Publication Data
US 2019/0162441 A1 May 30, 2019

(30) Foreign Application Priority Data
Nov. 30, 2017 (TW) ............................. 106217825 U (51) Int. Cl.
| | |
|---|---|
| *F24D 3/00* | (2006.01) |
| *F24H 1/06* | (2006.01) |
| *F24H 1/08* | (2006.01) |
| *F24H 9/14* | (2006.01) |
| *F24H 1/18* | (2006.01) |
| *F24H 1/00* | (2006.01) |

(52) U.S. Cl.
CPC ................ *F24H 1/06* (2013.01); *F24H 1/08* (2013.01); *F24H 1/186* (2013.01); *F24H 9/146* (2013.01); *F24H 1/0027* (2013.01); *Y02E 60/142* (2013.01)

(58) Field of Classification Search
CPC ... F24D 3/00; F24D 3/08; F24D 3/087; F24D 3/082; F24H 1/22; F24H 1/52
See application file for complete search history.

(56) References Cited

U.S. PATENT DOCUMENTS

| | | | | |
|---|---|---|---|---|
| 5,111,538 A | * | 5/1992 | Chapman | A47K 3/285 4/599 |
| 5,203,500 A | * | 4/1993 | Horne, Sr. | F24D 17/00 122/13.3 |
| 5,524,820 A | * | 6/1996 | Regan | F24H 1/06 122/13.3 |
| 6,049,919 A | * | 4/2000 | Roteman | A47K 3/285 4/602 |
| 6,059,143 A | * | 5/2000 | Weir | A45F 3/00 222/184 |
| 6,354,511 B1 | * | 3/2002 | Hardee | F24H 1/06 126/205 |
| 6,929,002 B1 | * | 8/2005 | Adrian | A47K 3/285 126/40 |

(Continued)

FOREIGN PATENT DOCUMENTS

GB    1093712 A  * 12/1967 ............... F24D 3/00

*Primary Examiner* — Gregory A Wilson (57) ABSTRACT

A portable hot water supply tank is adapted to be used with a heat source, and includes a water storage unit, a heat exchange unit, and a circulation unit. The water storage unit includes a base member defining a lower water chamber. The heat exchange unit includes a heat exchanger connected to the base member. The circulation unit includes an inlet pipe and an outlet pipe. The heat exchanger is movable relative to the base member between an unfolded position and a folded position. When the heat exchanger is at the first position, water stored in the lower water chamber is drawn into the inlet pipe, flows through the heat exchanger to be heated by the heat source, and eventually flows back to the lower water chamber via the outlet pipe.

11 Claims, 7 Drawing Sheets

(56) References Cited

U.S. PATENT DOCUMENTS

| | | | | |
|---|---|---|---|---|
| 7,047,577 B1* | 5/2006 | Cirilli | .................... | A47K 3/325 |
| | | | | 4/599 |
| 2007/0193576 A1* | 8/2007 | Hughes | .................. | F24C 13/00 |
| | | | | 126/513 |
| 2016/0313026 A1* | 10/2016 | Cool | ......................... | F28F 7/02 |

* cited by examiner

PORTABLE HOT WATER SUPPLY TANK

CROSS-REFERENCE TO RELATED APPLICATION

This application claims priority of Taiwanese Patent Application No. 106217825, filed on Nov. 30, 2017.

FIELD

The disclosure relates to a shower device, and more particularly to a portable hot water supply tank.

BACKGROUND

Figure 1:
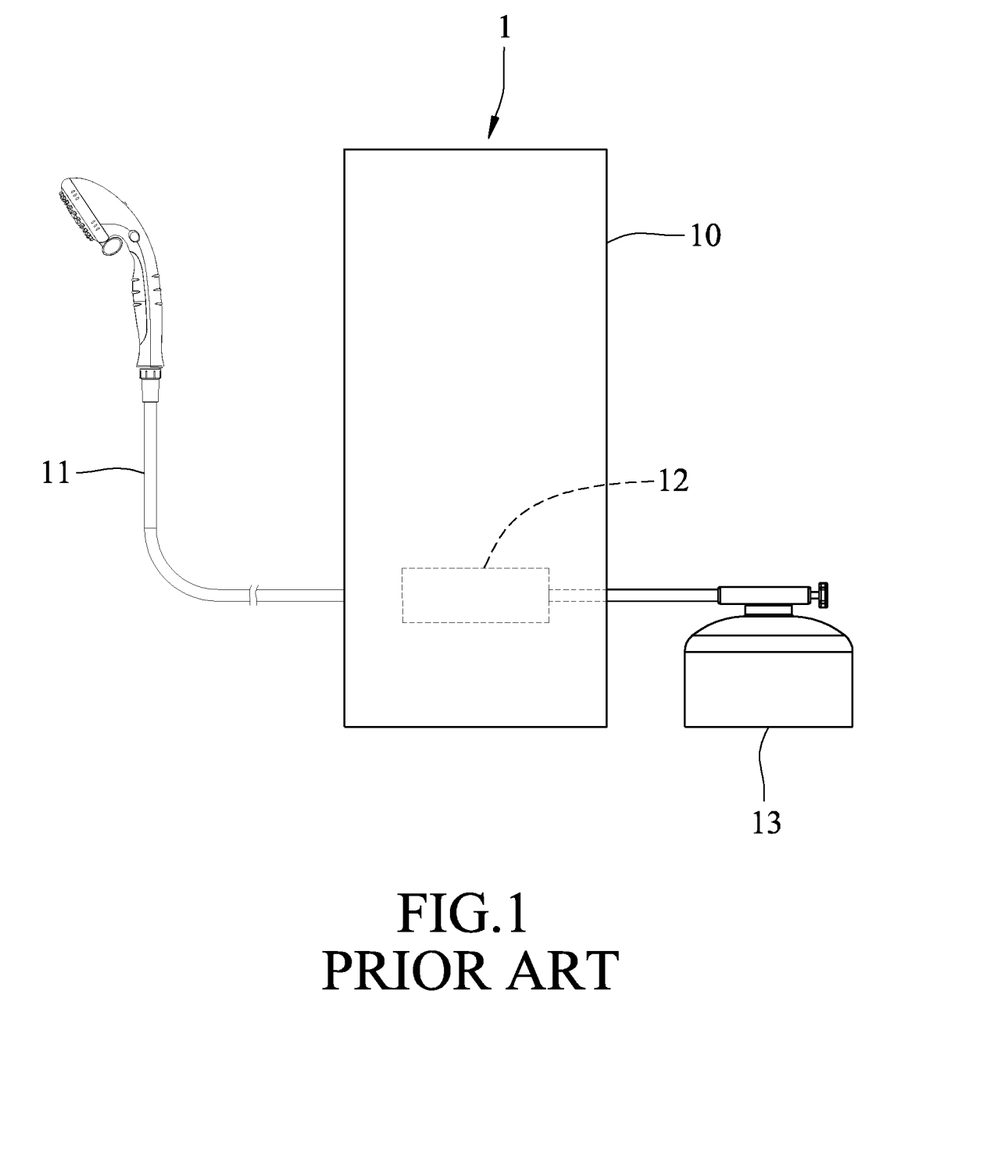
FIG. 1 is a schematic side view of a conventional outdoor shower device.

As shown in FIG. 1, a conventional outdoor shower device 1 includes a heating body 10, a water inlet connector (not shown) that is in fluid communication with the heating body 10, a water outlet connector 11 that is in fluid communication with the heating body 10, a heater 12 that is disposed in the heating body 10 and that is in fluid communication with the water inlet connector and the water outlet connector 11, and a gas tank 13 that is in fluid communication with the heater 12. During use, after water is poured into the water inlet connector, the heater 12 heats the water by burning gas provided by the gas tank 13 as water flows through the heater 12, and then the heated water is discharged from the water outlet connector 11. Thus, a user may conveniently enjoy a hot shower even outdoor.

However, because water directly flows out of the heating body 10 after being heated, the temperature of the water tends to fluctuate and is difficult to keep consistent. Moreover, since the heater 12 is fixed in the heating body 10, the outdoor shower device has a high manufacturing cost, and is inconvenient to transport.

SUMMARY

Therefore, the object of the disclosure is to provide a portable hot water supply tank that is lightweight and easy to transport, and that provides water at a consistent temperature.

According to the disclosure, the portable hot water supply tank is adapted to be used with a heat source, and includes a water storage unit, a heat exchange unit, and a circulation unit.

The water storage unit includes a base member. The base member has an inner surface that defines a lower water chamber, and an outer surface that is opposite to the inner surface.

The heat exchange unit includes a heat exchanger connected to the base member. The heat exchanger is movable relative to the base member between a first position, where the heat exchanger is distal from the outer surface of the base member and is adapted to be proximate to the heat source, and a second position, where the heat exchanger is proximate to the outer surface.

The circulation unit includes an inlet pipe and an outlet pipe. The inlet pipe has an inlet end that is in fluid communication with the lower water chamber, and an opposite end that is connected to the heat exchanger. The outlet pipe has an outlet end that is in fluid communication with the lower water chamber, and an opposite end that is connected to the heat exchanger. When the heat exchanger is at the first position, water stored in the lower water chamber is drawn into the inlet pipe via the inlet end, flows through the heat exchanger to be heated by the heat source, and eventually flows back to the lower water chamber via the outlet end of the outlet pipe.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 2:
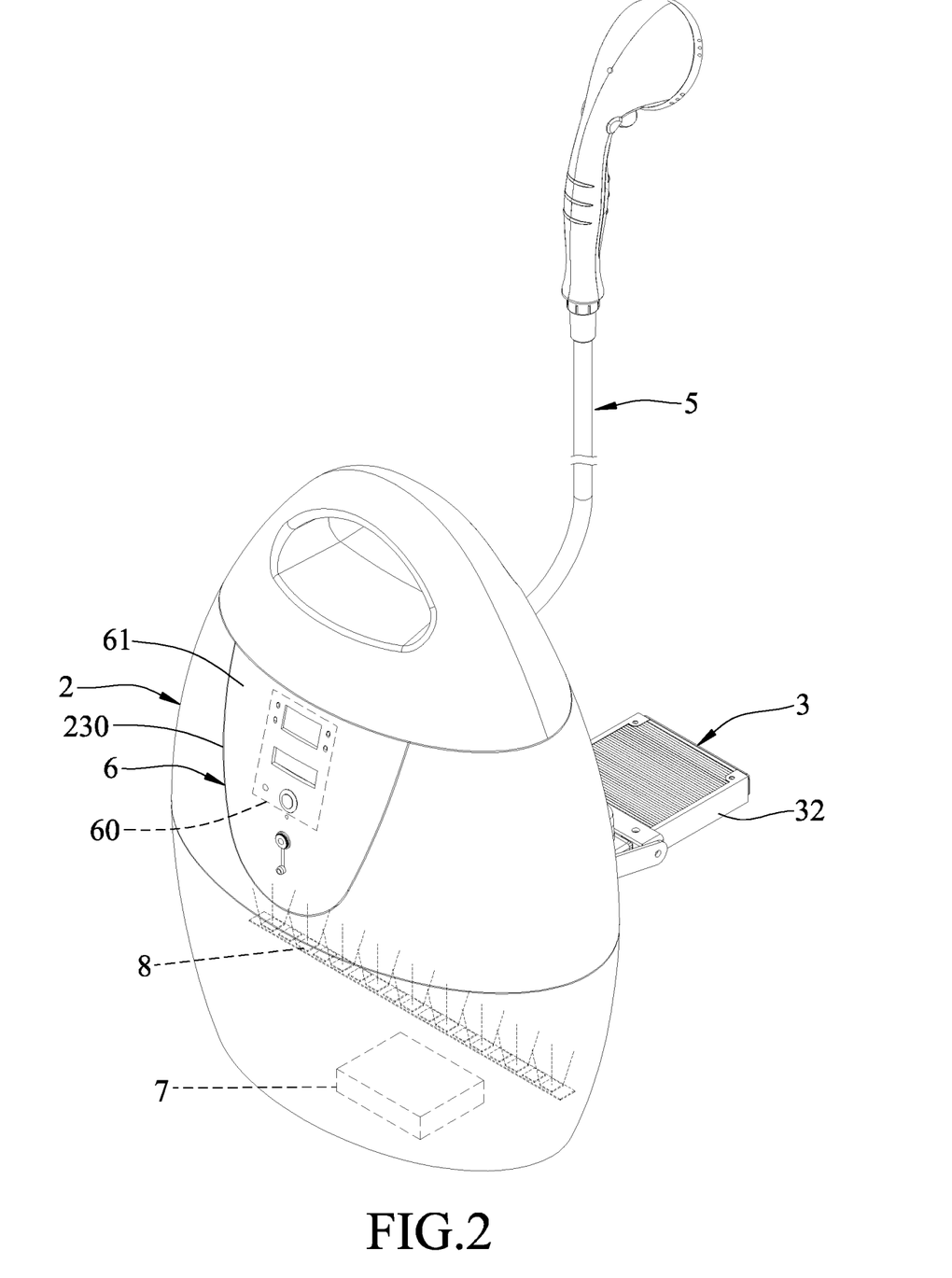
FIG. 2 is a perspective view of an embodiment of the portable hot water supply tank according to the disclosure, illustrating a heat exchanger of a heat exchange unit of the embodiment at a first position.
Figure 3:
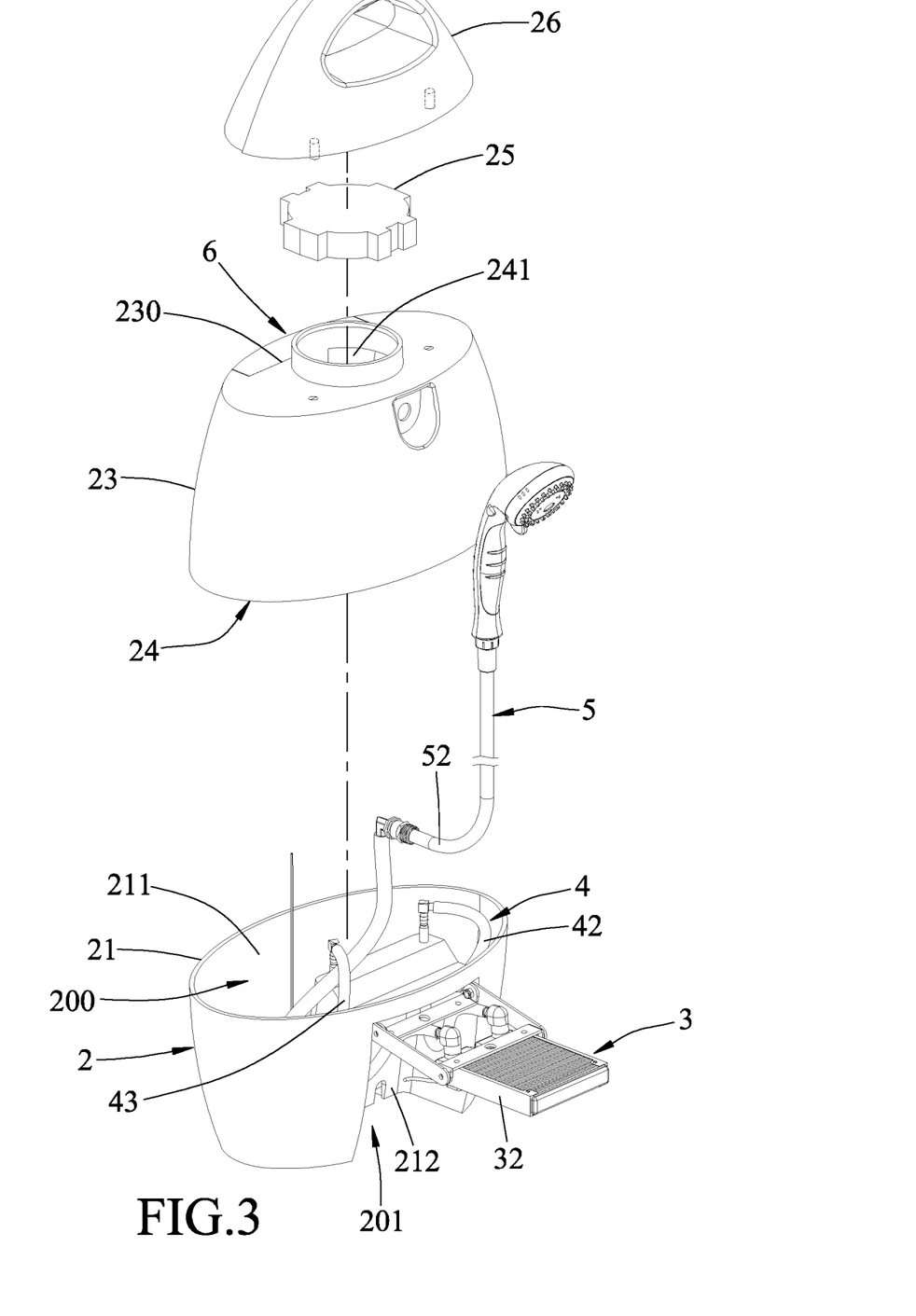
FIG. 3 is a partly exploded perspective view of the embodiment.
Figure 4:
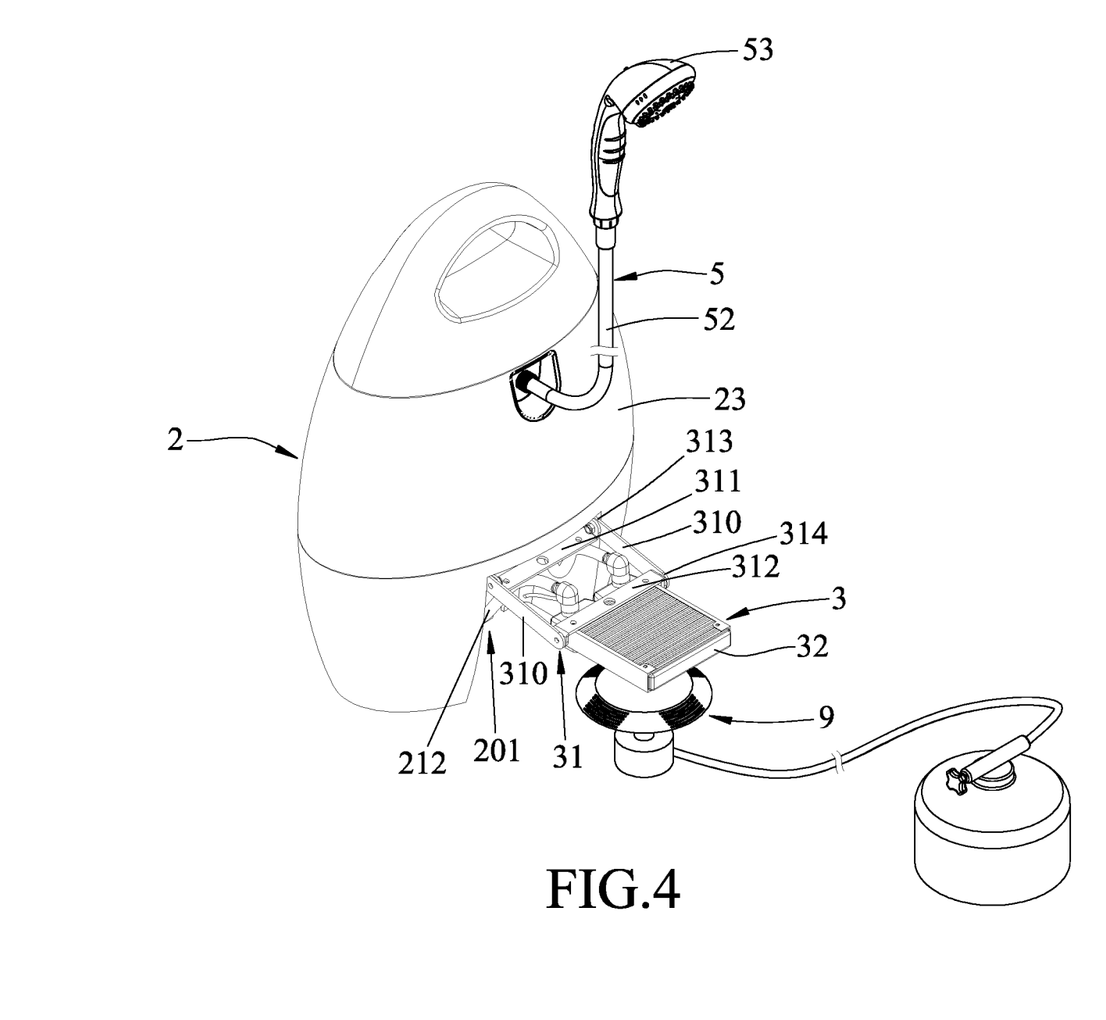
FIG. 4 is a fragmentary perspective view of the embodiment and a heat source, illustrating how the embodiment is used with the heat source.

Referring to FIGS. 2, 3 and 4, an embodiment of the portable hot water supply tank according to the disclosure is adapted to be used with a heat source 9. The portable hot water supply tank includes a water storage unit 2, a heat exchange unit 3, a circulation unit 4, a water dispensing unit 5, a control unit 6, a power supply unit 7, and a light source 8. In the following description, the heat source 9 is a mountain gas stove. However, it is understandable that a user may also use, for example, a portable butane gas stove or a barbecue charcoal fire as the heat source 9.

Figure 6:
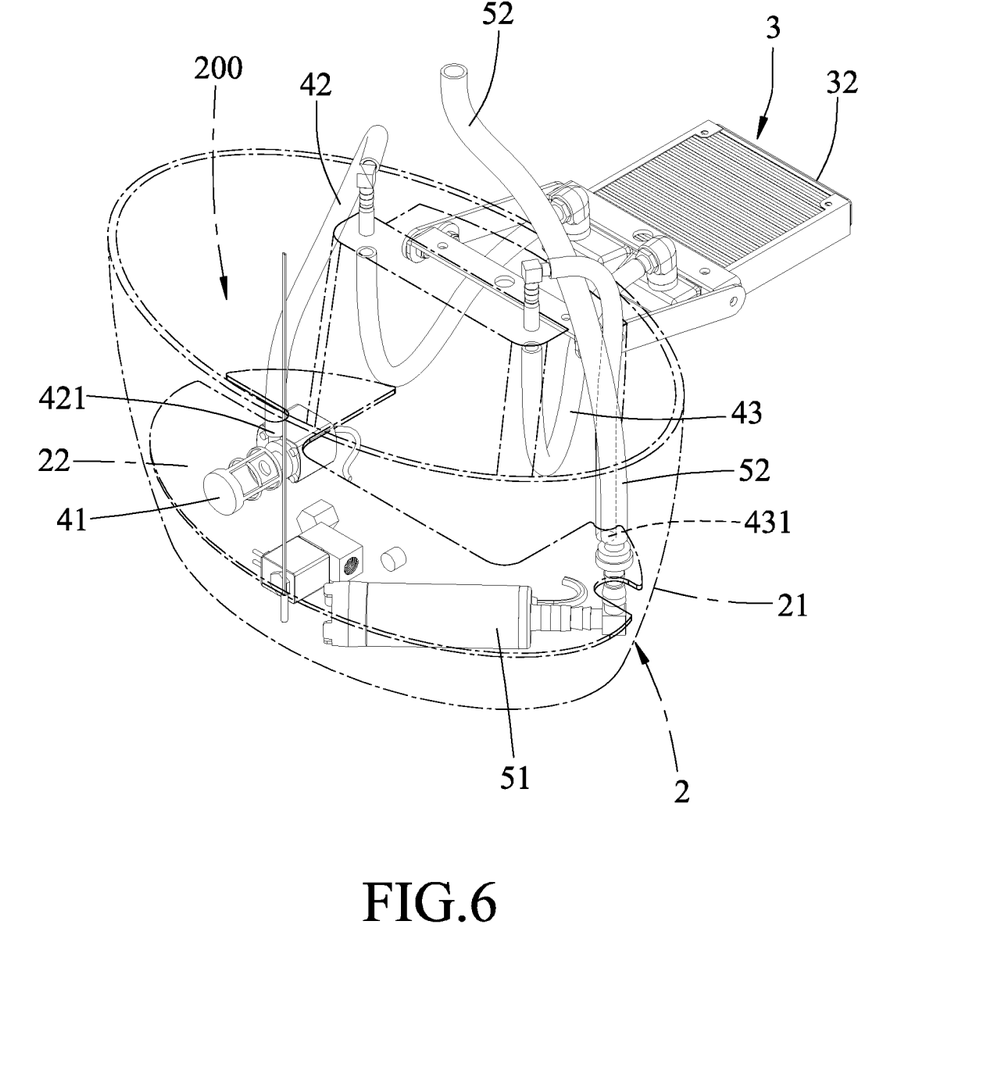
FIG. 6 is a fragmentary perspective view of the embodiment, illustrating a circulation unit connected to the heat exchanger.

Referring to FIGS. 3 and 6, the water storage unit 2 is made of a translucent material and includes a base member 21, a separation plate 22, a fixing member 23, a sealing cap 25 and a top member 26. The base member 21 has an inner surface 211 that defines a lower water chamber 200, and an outer surface 212 that is opposite to the inner surface 211. The outer surface 212 defines a storage space 201. The separation plate 22 is disposed in the lower storage chamber 200. The fixing member 23 is connected to a top end of the base member 21. The fixing member 23 is formed with an installment slot 230, and defines an upper water chamber 24 therein. The upper water chamber 24 has a bottom open end connected to the lower water chamber 200, and a top end formed with a water inlet opening 241. The sealing cap 25 removably seals the water inlet opening 241, and the top member 26 is detachably mounted to the fixing member 23. In certain embodiments, the fixing member 23 and the base member 21 have a watertight connection in order to allow both the upper water chamber 24 and the lower water chamber 200 to contain water. The user may see through the translucent material of the water storage unit 2 and directly monitor the water level.

Figure 5:
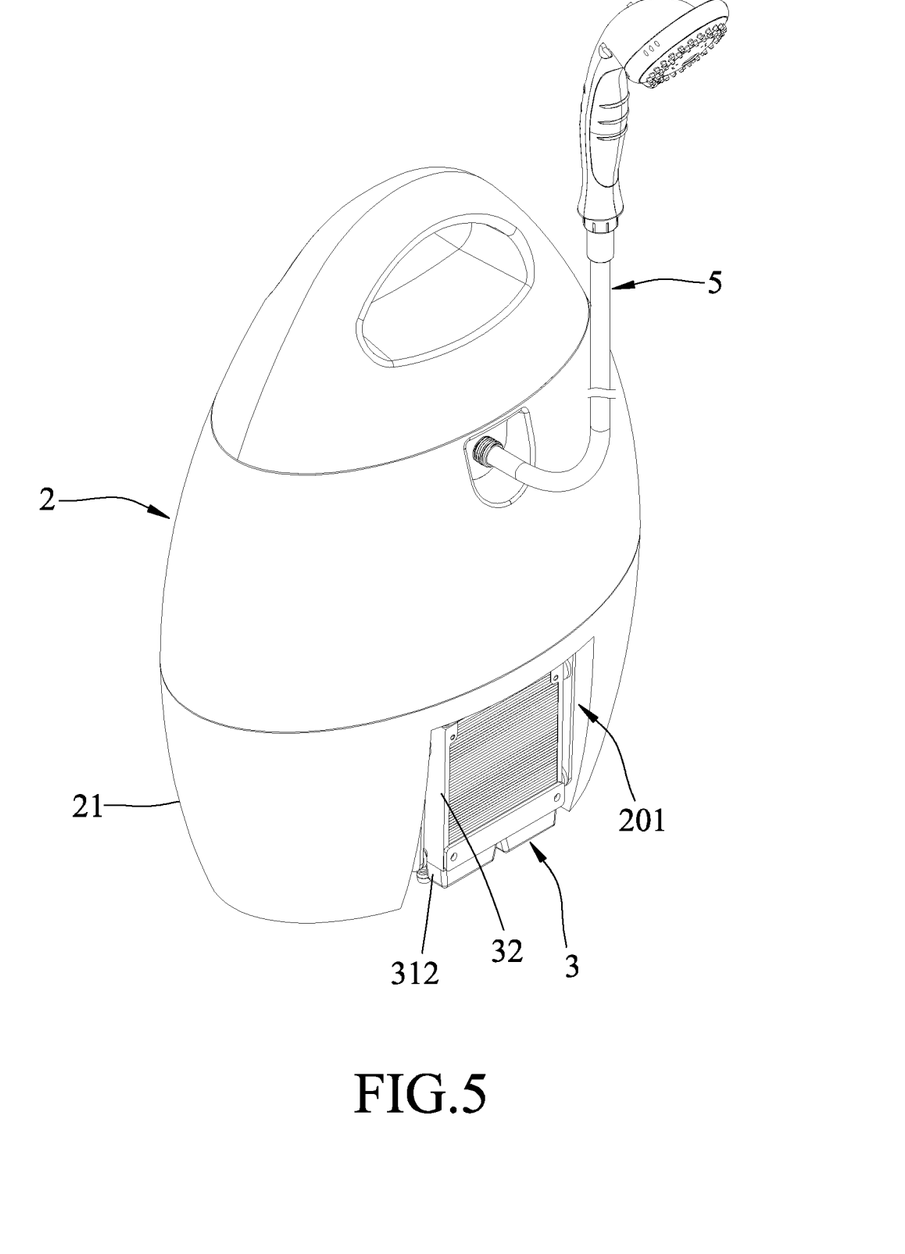
FIG. 5 is another perspective view of the embodiment, illustrating the heat exchanger at a second position.

Referring to FIGS. 4 and 5, the heat exchange unit 3 includes a supporting frame 31, and a heat exchanger 32 that is pivotably connected to the supporting frame 31 and that is removably stored in the indented storage space 201. The supporting frame 31 includes two pivot rods 310. Each of the pivot rods 310 includes a pivot end 313 that is pivotably connected to the outer surface 212 of the base member 21, and a free end 314 that is opposite to the pivot end 313. The supporting frame 31 further includes a first connecting rod 311 connected between the two pivot ends 313 of the pivot rods 310, and a second connecting rod 312 connected between the two free ends 314 of the pivot rods 310.

The heat exchanger 32 is connected pivotally to the free ends 314 of the pivot rods 310, and is movable relative to the base member 21 between a first position (see FIG. 4), where the second connecting rod 312 is distal from the outer surface 212 and where the heat exchanger 32 is distal from the outer surface 212 of the base member 21 and is adapted to be proximate to a heat source 9, and a second position (see FIG. 5), where the second connecting rod 312 is proximate to the outer surface 212 and where the heat exchanger 32 is proximate to the outer surface 212 and is retained in the storage space 201. The heat exchanger 32 is substantially vertical at the second position, and is substantially horizontal and disposed above the heat source 9 at the first position so as to work efficiently. In the present embodiment, the heat exchanger 32 is a condenser, and has fins for increasing a heat exchange area.

Referring to FIGS. 3 and 6, the circulation unit 4 includes a first pump 41 disposed in the lower water chamber 200, an inlet pipe 42, and an outlet pipe 43. The inlet pipe 42 has an inlet end 421 that is connected to the first pump 41 and that is in fluid communication with the lower water chamber 200, and an opposite end that is connected to the heat exchanger 32. The outlet pipe 43 has an outlet end 431 that is in fluid communication with the lower water chamber 200, and an opposite end that is connected to the heat exchanger 32. In the present embodiment, the first pump 41 is a submersible pump, and is disposed in the lower water chamber 200 under the separation plate 22. When the heat exchanger 32 is at the first position, the first pump 41 draws water stored in the lower water chamber 200 into the inlet pipe 42 via the inlet end 421. Then, the water flows through the heat exchanger 32 to be heated by the heat source 9, and eventually flows back to the lower water chamber 200 via the outlet end 431 of the outlet pipe 43. In such a manner, the water stored in the lower water chamber 200 repeatedly circulates between the lower water chamber 200 and the heat exchanger 32.

Referring to FIGS. 3, 4 and 6, the water dispensing unit 5 is in fluid communication with the lower water chamber 200 and is connected to the fixing member 23 of the water storage unit 2. The water dispensing unit 5 includes a second pump 51 that is disposed in the lower water chamber 200 under the separation plate 22, a water dispensing pipe 52 that is connected to the second pump 51 and that extends outwardly from the fixing member 23, and a water dispensing head 53 that is disposed outside the fixing member 23 and that is connected to the water dispensing pipe 52. In the present embodiment, the second pump 51 is a submersible pump, and is operable to transport water from the lower water chamber 200 to the water dispensing head 53 via the water dispensing pipe 52. In the present embodiment, the water dispensing head 53 is a shower head which is suitable for showering.

Referring to FIGS. 2 and 3, the control unit 6 is mounted in the installment slot 230 and includes a control module 60 for controlling operation of the circulation unit 4 and the water dispensing unit 5, and a display panel 61 being electrically connected to the control module 60 and being used for presenting information. A water temperature is monitored by the control module 60 and displayed on the display panel 61. When the heat exchanger 32 is at the first position, a sensor (not shown) triggers the control unit 6 to actuate operation of the circulation unit 4 to initiate a water circulation between the lower water chamber 200 and the heat exchanger 32. The user may adjust the water temperature or activate the water dispensing unit 5 via the display panel 61.

It should be noted that, in other variations of the embodiment, when the water storage unit 2 is made of opaque materials, the user may acquire information of the water level in the water storage unit 2 via the control unit 6 instead.

In the present embodiment, the power supply unit 7 is a battery, and is electrically connected to and provides electricity to the first pump 41, the second pump 51, and the control unit 6. The remaining electrical energy of the power supply unit 7 is monitored by the control module 60 and displayed on the display panel 61. Therefore, the present embodiment is suitable for use in remote areas where electric power is not accessible. However, in other variations of the embodiment, the power supply unit 7 may be omitted, and the first pump 41, the second pump 51, and the control unit 6 may draw power from other external power sources.

The light source 8 is disposed in the water storage unit 2 for facilitating observation of water level in the water storage unit 2. Preferably, the light source 8 is a waterproof LED light strip and is affixed onto the separation plate 22, projecting light upward such that the user may have a better view of the water level through the translucent material of the water storage unit 2.

Figure 7:
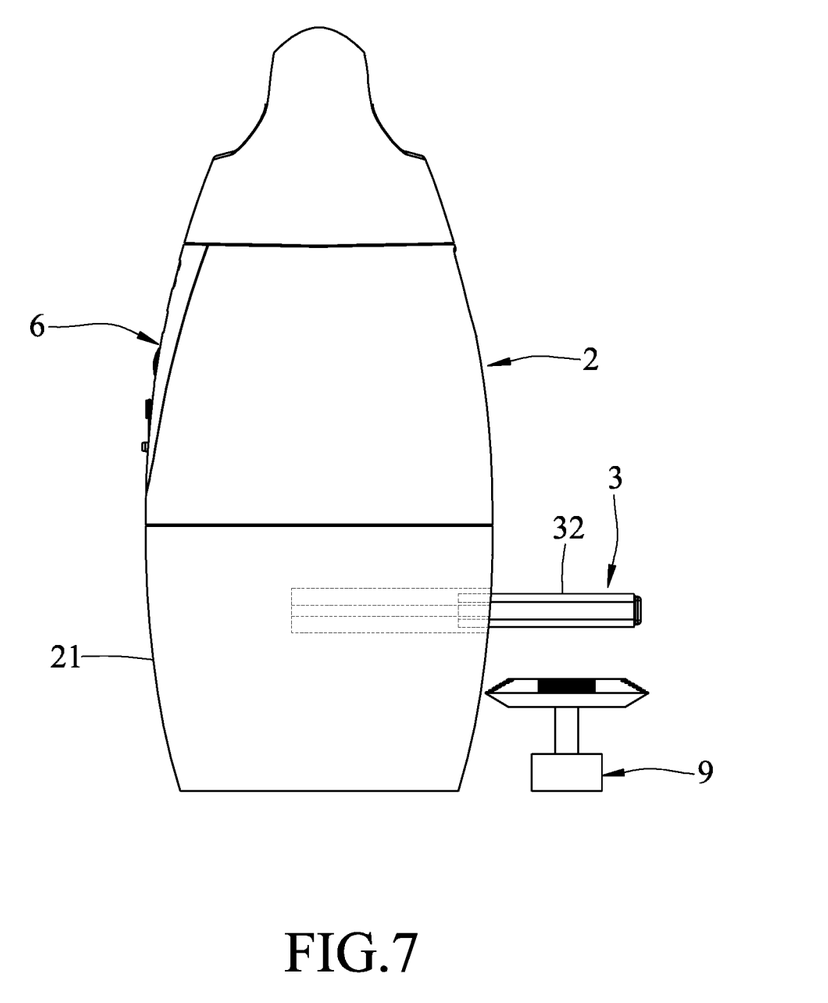
FIG. 7 is a side view of the embodiment and the heat source, illustrating a variation of the heat exchange unit.

It should be noted that, in another variation of the heat exchanger 32 as shown in FIG. 7, the heat exchanger 32 may be configured as a drawer, which can be retained in the base member 21 when at the second position.

Referring to FIGS. 3 and 4, when the user intends to use hot water delivered from the present embodiment, first, the top member 26 and the sealing cap 25 is removed from the fixing member 23 to expose the water inlet opening 241. Then, water is poured into the lower water chamber 200 via the water inlet opening 241. Next, the heat exchanger 32 is moved to the first position, and the heat source 9 is placed under the heat exchanger 32 and then ignited. At this point, the water stored in the lower water chamber 200 would be drawn into the inlet pipe 42, flow through the heat exchanger 32 to be heated by the heat source 9, and eventually flow back to the lower water chamber 200 via the outlet pipe 43. This circulation of water is repeated for a number of times until the water temperature reaches a set temperature. Then, the user may operate the control module 60 via the display panel 61 (see FIG. 2) to activate the water dispensing unit 5, allowing the hot water stored in the water storage unit 2 to be discharged from the water dispensing head 53, and the user may start showering.

Given the description above, the advantages of the aforementioned embodiment may be summarized as follows:

1. Since the water is repeatedly circulated between the heat exchanger 32 and the water storage unit 2 via the inlet pipe 42 and the outlet pipe 43 of the circulation unit 4, the temperature of the water may be kept consistent. Thus, compared with the prior art, the disclosure is more effective in providing hot water at a consistent temperature.

2. After the heat exchanger 32 is moved to the first position, the user may use the external heat source 9 to heat up the heat exchanger 32. Since the built-in heating element illustrated in the prior art is omitted here, the overall weight of the disclosure is greatly reduced, allowing for easier transportation and reducing manufacturing cost.

3. The heat exchange unit 3 of the disclosure may be retained in the storage space 201 for convenience of transportation.

4. The display panel 61 is able to display at least one of the water level, the water temperature, and the remaining electrical energy, to ensure that the user may complete the shower without any inconveniences.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A portable hot water supply tank adapted to be used with a heat source, said portable hot water supply tank comprising:
    a water storage unit that includes a base member having
        an inner surface that defines a lower water chamber, and
        an outer surface that is opposite to said inner surface;
    a heat exchange unit that includes a heat exchanger being connected to said base member and being movable relative to said base member between a first position, where said heat exchanger is distal from said outer surface of said base member and is adapted to be proximate to the heat source, and a second position, where said heat exchanger is proximate to said outer surface; and
    a circulation unit that includes
        an inlet pipe having an inlet end that is in fluid communication with said lower water chamber, and an opposite end that is connected to said heat exchanger, and
        an outlet pipe having an outlet end that is in fluid communication with said lower water chamber, and an opposite end that is connected to said heat exchanger;
    wherein, when said heat exchanger is at the first position, water stored in said lower water chamber is drawn into said inlet pipe via said inlet end, flows through said heat exchanger to be heated by the heat source, and eventually flows back to said lower water chamber via said outlet end of said outlet pipe.

2. The portable hot water supply tank as claimed in claim 1, wherein:
    said outer surface of said base member defines a storage space; and
    when said heat exchanger is at the first position, said heat exchanger is stored in said storage space.

3. The portable hot water supply tank as claimed in claim 2, wherein:
    said heat exchange unit is pivotally connected to said base member, and further includes a supporting frame including opposite first and second connecting rods;
    when said heat exchanger is at the first position, said second connecting rod is distal from said outer surface of said base member; and
    when said heat exchanger is at the second position, said second connecting rod is proximate to said outer surface.

4. The portable hot water supply tank as claimed in claim 3, wherein:
    when said heat exchanger is at the first position, said heat exchanger is substantially horizontal; and
    when said heat exchanger is at the second position, said heat exchanger is substantially vertical.

5. The portable hot water supply tank as claimed in claim 1, wherein:
    said water storage unit further includes a fixing member that is connected to a top end of said base member; and
    said portable hot water supply tank further comprises a water dispensing unit that is in fluid communication with said lower water chamber and that is connected to said fixing member of said water storage unit.

6. The portable hot water supply tank as claimed in claim 5, wherein:
    said water storage unit further includes a separation plate that is disposed in said lower storage chamber;
    said circulation unit further includes a first pump that is connected to said inlet pipe and that is disposed in said lower water chamber under said separation plate for drawing the water from said lower water chamber into said inlet pipe;
    said water dispensing unit includes
        a second pump that is disposed in said lower water chamber under said separation plate,
        a water dispensing pipe that is connected to said second pump and that extends outwardly of said fixing member, and
        a water dispensing head that is disposed outside said fixing member and that is connected to said water dispensing pipe; and
    said second pump is operable for transporting water from said lower water chamber to said water dispensing head via said water dispensing pipe.

7. The portable hot water supply tank as claimed in claim 6, further comprising a power supply unit that provides electricity to said first pump and said second pump.

8. The portable hot water supply tank as claimed in claim 7, wherein said fixing member defines an upper water chamber that has a bottom open end connected to said lower water chamber, and a top end formed with a water inlet opening.

9. The portable hot water supply tank as claimed in claim 8, wherein:
    said fixing member is formed with an installment slot; and
    said portable hot water supply tank further comprises a control unit that is mounted in said installment slot and that includes
        a control module for controlling operation of said circulation unit and monitoring at least one of water level in said water storage unit, water temperature in said water storage unit, and remaining electrical energy of said power supply unit, and a display panel being electrically connected to said control module and being used for presenting information.

10. The portable hot water supply tank as claimed in claim 1, further comprising a control unit that is mounted to said water storage unit, and that actuates operation of said circulation unit to initiate a water circulation between said lower water chamber and said heat exchanger when said heat exchanger is at the first position.

11. The portable hot water supply tank as claimed in claim 1, further comprising a light source that is disposed in said water storage unit for facilitating observation of water level in said water storage unit.

* * * * *